United States Patent
Takeuchi et al.

(10) Patent No.: US 6,373,025 B1
(45) Date of Patent: Apr. 16, 2002

(54) APPARATUS AND METHOD FOR LASER FUSION BONDING

(75) Inventors: Kiyoshi Takeuchi, Toyono-gun; Shirou Takigawa, Kyoto; Takahiko Kondou, Suita; Takashi Hosoya, Ibaraki; Yasukuni Iwasaki, Kawanishi; Koichi Abe, Yokkaichi, all of (JP)

(73) Assignees: Shinmaywa Industries, Ltd., Hyogo (JP); Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/492,292

(22) Filed: Jan. 27, 2000

(30) Foreign Application Priority Data

Feb. 3, 1999 (JP) .............................................. 11-026645

(51) Int. Cl.[7] ........................ B23K 26/20; C03C 27/00
(52) U.S. Cl. ................................................. 219/121.64
(58) Field of Search ..................... 219/121.63, 121.64, 219/121.74, 121.75; 65/36, 59.1, 392

(56) References Cited

U.S. PATENT DOCUMENTS

| | | | | |
|---|---|---|---|---|
| 3,607,176 A | * | 9/1971 | Milochevitch et al. | 65/59.32 |
| 4,400,870 A | * | 8/1983 | Islam | 219/121.64 |
| 5,461,275 A | * | 10/1995 | Oshima | 313/141 |
| 5,517,059 A | * | 5/1996 | Eytcheson et al. | 313/144 |
| 5,820,648 A | * | 10/1998 | Akaike et al. | 65/59.1 |

* cited by examiner

Primary Examiner—Samuel M. Heinrich
(74) Attorney, Agent, or Firm—Oliff & Berridge, PLC

(57) ABSTRACT

A laser fusion bonding apparatus includes a laser beam irradiation unit for emitting a laser beam with which portions of two works which are in contact with or close to each other are irradiated, and thereby fusion bonded. The laser beam is a substantially-parallel laser beam.

11 Claims, 8 Drawing Sheets

PRIOR ART

APPARATUS AND METHOD FOR LASER FUSION BONDING

BACKGROUND OF THE INVENTION

1. Field of the Invention

The present invention relates to an apparatus and method for fusion bonding works by irradiating them with laser beams.

2. Description of the Related Art

There is a technique for fusion bonding two works, for example, two pieces of glasses by using a laser beam. It is necessary to perform fusion bonding of the glasses when two glass plates are laminated to thereby fabricate a laminated glass, for example.

Referring to FIGS. 10A and 10B, a spacer (not shown) having a minute height is sandwiched between two glass plates 104a and 104b as first and second works. Hence, there is a minute clearance corresponding to the height of the spacer between the two glass plates 104a and 104b.

A laser machine A100 comprises a work table 103 for fixing the glass plates 104a and 104b thereon, and a machining head 108 for emitting a laser beam ($CO_2$ laser) with which the glass plates 104a and 104b are irradiated. The machining head 108 is movable relatively to the work table 103 in directions of three axes which are orthogonal with one another. The laser machine A100 is configured such that a laser generator 102 generates a laser beam, which is guided to the machining head 108 by mirrors 117 and 118 disposed in appropriate positions on an optical path, and then brought into convergence by an objective lens 119, to thereby irradiate the glass plates 104a and 104b.

In a fusion bonding process, the two glass plates 104a and 104b are fixed on the work table 103, and the machining head 108 is moved relatively to the work table 103 such that it moves relatively along peripheral portions of the glass plates 104a and 104b while irradiating the peripheral portions represented by oblique lines in FIG. 10A with a laser beam 105. The fusion bonding is completed when the machining head 108 makes a round of the peripheral portions of the glass plates 104a and 104b, resulting in a sealed space between the glass plates 104a and 104b that is shut off from the outside. A gas such as dry air is filled into the space, whereby a highly heat-insulating laminated glass is fabricated.

In the laser fusion bonding method described above, as shown in FIG. 10B, the laser beam 105 with which the glass plates 104a and 104b are irradiated is a convergent beam. For this reason, it is necessary to adjust a spot diameter S of the laser beam 105 on the glass plates 104a and 104b so as to have a size optimal for fusion bonding by moving the machining head 108 in an optical axis direction of the laser beam 105. However, when the machining head 108 is thus moved for adjusting the spot diameter S so as to have the optimal size, deviation relating to its positioning precision occurs, thereby causing a variation of the spot diameter S. In this state, when the spot diameter S is too small due to the variation, a heating range is correspondingly small, leading to unsatisfactory fusion bonding, while when the spot diameter S is too large due to the variation, the temperature of the irradiated spot does not rise to its highest, also leading to unsatisfactory fusion bonding.

SUMMARY OF THE INVENTION

The present invention is directed to solving the above problem, and an object of the present invention is to provide an apparatus and method for laser fusion bonding that are capable of reducing unsatisfactory fusion bonding when two works are irradiated with a laser beam to be thereby fusion bonded.

In one aspect of the present invention, there is provided a laser fusion bonding apparatus comprising a laser beam irradiation unit, for fusion bonding portions of at least two works, which are in contact with or close to each other, by irradiating the portions with a laser beam emitted by the laser beam irradiation unit, wherein the laser beam with which the portions are irradiated is a laser beam (hereinafter referred to as a substantially-parallel laser beam) in which rays of light are substantially parallel to one another.

In another aspect of the present invention, there is provided a laser fusion bonding method for fusion bonding portions of at least two works, which are in contact with or close to each other, by irradiating the portions with a laser beam, wherein the laser beam with which the portions are irradiated is a substantially-parallel laser beam.

In the apparatus and the method described above, since the laser beam with which the portions of the works to be fusion bonded (portions to be fusion bonded) are irradiated is the substantially-parallel laser beam, the shapes of spots irradiated with the laser beam in the portions to be fusion bonded are substantially the same even if a distance between the works and a part of the laser beam irradiation unit for emitting the laser beam varies. Thus, unsatisfactory fusion bonding is reduced.

In the apparatus and the method described above, the substantially-parallel laser beam may have a projected shape substantially identical to a predetermined shape so that the spot irradiated with the laser beam in the portions to be fusion bonded has the predetermined shape.

In the apparatus and the method described above, a sectional shape of the laser beam emitted by the laser generator may be converted through the collimation to thereby generate the substantially-parallel laser beam whose projected shape is substantially identical to the predetermined shape. With this configuration, the sectional shape of the substantially-parallel laser beam with which the portions to be fusion bonded are irradiated can be adjusted by the collimation. The collimation is, for example, constituted of collimator lenses, or combination of a concave mirror and a convex mirror.

In the apparatus and the method described above, the sectional shape of the laser beam emitted by the laser generator may be converted through an aperture to generate the substantially-parallel laser beam whose projected shape is substantially identical to the predetermined shape. With this configuration, the sectional shape of the substantially-parallel laser beam with which the portions to be fusion bonded are irradiated can be easily adjusted by varying a shape of an opening of the aperture.

In the apparatus and the method described above, the laser generator may be adapted to generate the substantially-parallel laser beam whose projected shape is substantially identical to the predetermined shape. With this configuration, the structure of the laser irradiation unit can be simplified.

In the apparatus and the method described above, the portions to be fusion bonded may be preheated so as to have a temperature lower than a fusion bonding temperature of the works before the works are fusion bonded by using the substantially-parallel laser beam, and the fusion bonded portions of the works are slowly cooled so as to have a temperature lower than the fusion bonding temperature of the works after the works are fusion bonded by using the substantially-parallel laser beam. With this configuration, since the portions to be fusion bonded are first preheated so as to have the temperature lower than the fusion bonding temperature of the works, the gradient of the temperature in the portions to be fusion bonded and their periphery is gentle. Then, the portions to be fusion bonded are heated so as to have the temperature higher than the fusion bonding temperature. In this case, however, the sharp gradient of the temperature in the works does not occur even if the portions to be fusion bonded has the temperature higher than the fusion bonding temperature, because the periphery of the portions to be fusion bonded is also preheated. Thereafter, the fusion bonded portions are slowly cooled, and thereby the sharp gradient of the temperature in the fusion bonded portions and their periphery caused by rapidly cooling the fusion bonded portions is avoided. As a result, crack due to the sharp gradient of temperature in the works can be reduced. It should be noted that the fusion bonded portions may be slowly cooled while they are heated.

This object, as well as other objects, features and advantages of the invention will become more apparent to those skilled in the art from the following description taken with reference to the accompanying drawings.

BRIEF DESCRIPTION OF THE DRAWINGS

FIGS. 5A–5C are diagrams showing another example of the apparatus and method for laser fusion bonding, wherein FIG. 5A is a diagram showing a structure of the laser fusion bonding apparatus in a preheating process, FIG. 5B is a diagram showing a structure of the laser fusion bonding apparatus in a fusion bonding process, and FIG. 5C is a diagram showing a structure of the laser fusion bonding apparatus in a slow cooling process;

FIGS. 7A and 7B are diagrams showing a further example of the apparatus and method for laser fusion bonding, wherein FIG. 7A is a perspective view schematically showing the state in which works are irradiated with a substantially-parallel laser beam, and FIG. 7B is a sectional view taken in the direction of the arrows substantially along the line VIIa—VIIa of FIG. 7A;

FIGS. 8A and 8B are diagrams showing a glass artifact fusion bonded by irradiating peripheral portions of two glass plates with a substantially-parallel laser beam by using a laser fusion bonding apparatus having the configuration identical to that of the laser fusion bonding apparatus in FIG. 1, wherein FIG. 8A is a photograph and FIG. 8B is a diagram by making a sketch of the photograph in FIG. 8A;

FIGS. 9A and 9B are diagrams showing the state in which the glass artifact in FIG. 8A is broken in a width direction around a center in a longitudinal direction, wherein FIG. 9A is a photograph and FIG. 9B is a diagram by making a sketch of the photograph in FIG. 9A; and FIGS. 10A and 10B are diagrams for explaining a process state in which peripheral portions of two glass plates are fusion bonded by using a conventional laser beam machine, wherein FIG. 10A is a perspective view showing the process state and FIG. 10B is a diagram showing a method for adjusting a spot diameter of a laser beam on works emitted by the laser beam machine.

DETAILED DESCRIPTION OF THE PREFERRED EMBODIMENTS

Hereinafter, preferred embodiments of the present invention will be described with reference to drawings.

Figure 1:
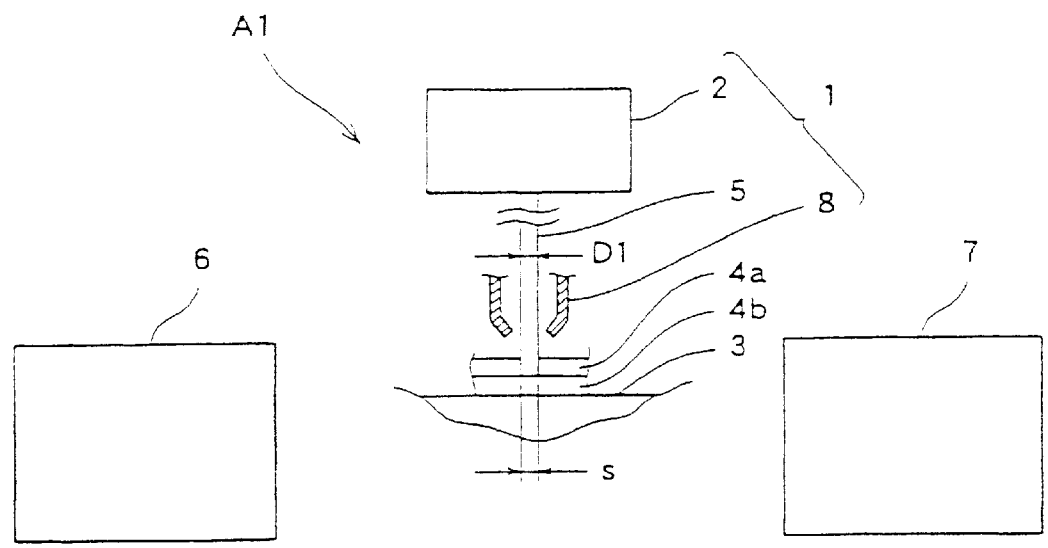
FIG. 1 is a diagram for explaining an apparatus and method for laser fusion bonding.

Referring now to FIG. 1, reference numeral A1 denotes a laser fusion bonding apparatus, which comprises a laser beam irradiation unit 1 for emitting a substantially-parallel laser beam, and a work table 3 for fixing first and second works thereon. In this illustrated example, a glass plate 4a is fixed as the first work and a glass plate 4b is fixed as the second work. The expression "substantially-parallel laser beam" refers to a laser beam in which rays are substantially parallel to one another. The laser beam irradiation unit 1 comprises a laser generator 2 for generating a laser beam 5, a guiding tube (not shown) for guiding the laser beam 5 generated by the laser generator 2, and a machining head 8 for irradiating the glass plates 4a and 4b with the laser beam 5 guided by the guiding tube. The laser fusion bonding apparatus A1 further comprises a movement mechanism (not shown) for moving the machining head 8 relatively to the work table 3 in directions of three axes orthogonal with one another.

The laser beam emitted by the laser generator 2 is $CO_2$ laser. The laser beam 5 is a substantially-parallel laser beam having a sectional shape(transverse sectional shape) such that its projected shape on the glass plates 4a and 4b is substantially identical to a predetermined shape. Herein, the predetermined shape is a circle, although it may take any shape. A diameter of a spot to be irradiated with the laser beam 5, i.e., a spot diameter S, is set such that it has a size optimal for fusion bonding the glass plates 4a and 4b. A diameter D1 of the laser beam 5 emitted by the laser generator 2 is identical to the spot diameter S to be set on the glass plates 4a and 4b.

The machining head 8 is movable relatively to the work table 3 in a three-dimensional direction and is capable of changing angles in horizontal and vertical planes by means of the movement mechanism. A mirror (not shown) is placed on an optical path of the laser beam 5 from the laser generator 2 to the end of the machining head 8 to allow the machining head 8 to move relatively to the work table 3 or change angles.

A spacer having a minute height is interposed between the glass plates 4a and 4b, and therefore there is a clearance corresponding to the height of the spacer between the glass plates 4a and 4b.

In FIG. 1, reference numeral 6 denotes a preheating chamber for preheating the glass plates 4a and 4b before fusion bonding, and reference numeral 7 denotes a slow cooling chamber for slowly cooling the glass plates 4a and 4b after fusion bonding. These are automatically temperature-adjustable chamber, a constant-temperature bath, or the like.

Subsequently, operation of the laser fusion bonding apparatus A1 will be described.

Initially, the temperatures of the preheating chamber 6 and the slow cooling chamber 7 are respectively set at predetermined values less than that of the fusion bonding temperature of the glass plates 4a and 4b.

Then, the glass plates 4a and 4b are put in the preheating chamber 6 for predetermined time so as to have a temperature lower than the fusion bonding temperature of the glass plates 4a and 4b. That is, the glass plates 4a and 4b are preheated. Thereafter, the glass plates 4a and 4b are taken out of the preheating chamber 6 and fixed on the work table 3 of the laser fusion bonding apparatus A1.

Then, the machining head 8 is moved relatively to the work table 3 by means of the movement mechanism such that it moves relatively along peripheral portions of the glass plates 4a and 4b while irradiating the peripheral portions of the glass plates 4a and 4b fixed on the work table 3 with the substantially-parallel laser beam 5. When the machining head 8 makes a round of the peripheral portions of the glass plates 4a and 4b, the fusion bonding process is completed.

It should be noted that the work table 3 may be moved by means of the movement mechanism with the machining head 8 fixed.

Thereafter, the fusion bonded glass plates 4a and 4b are put in the slow cooling chamber 7 for predetermined time. Thereby, the temperature of the fusion bonded portions of the glass plates 4a and 4b is gradually reduced to a value less than that of the fusion bonding temperature. That is, the glass plates 4a and 4b are slowly cooled. Thereafter, the glass plates 4a and 4b are taken out of the slow cooling chamber 7, whereby the fusion bonding of the glass plates 4a and 4b is completed.

Thus, in the laser fusion bonding apparatus A1, the substantially-parallel laser beam is used to perform fusion bonding of the glass plates 4a and 4b. Hence, the spot diameters S in the portions to be fusion bonded are substantially the same, even if deviation in the optical axis direction of the substantially-parallel laser beam occurs when the machining head 8 moves and thereby a distance between the machining head 8 and the glass plates 4a and 4b varies. As a consequence, unsatisfactory fusion bonding can be reduced.

In addition, since the preheating process and the slow cooling process are provided before and after the fusion bonding process for the glass plates 4a and 4b, respectively, the sharp gradient of the temperature in the glass plates 4a and 4b hardly occurs, and crack due to the sharp temperature gradient can be thereby reduced.

Figure 2:
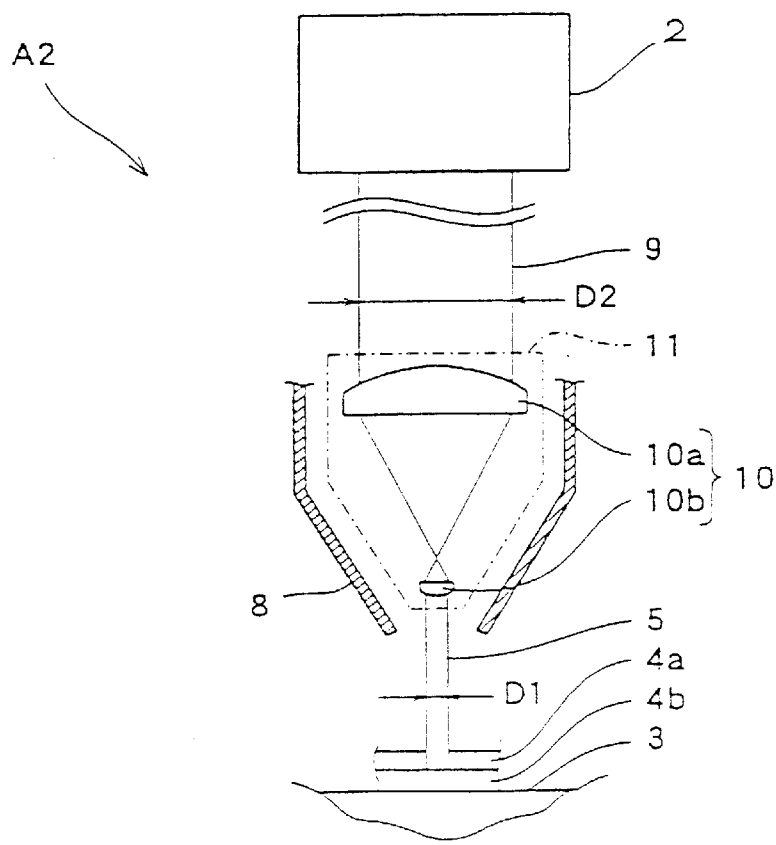
FIG. 2 is a diagram showing an example of another structure of the laser fusion bonding apparatus.

Referring to FIG. 2, there is shown a laser fusion bonding apparatus A2, which is identical to the laser fusion bonding apparatus A1 in FIG. 1 except that the substantially-parallel laser beam 5 having the predetermined diameter D1 with which the glass plates 4a and 4b are irradiated is generated by passing a substantially-parallel laser beam 9 having a diameter D2 emitted by the laser generator 2 through a collimation 11.

Specifically, in the laser fusion bonding apparatus A2, the laser generator 2 generates the substantially-parallel laser beam 9. On an optical path of the substantially-parallel laser beam 9 in the machining head 8, there is provided collimator lenses 10 as the collimation 11, constituted of a first convex lens 10a and a second convex lens 10b having a focal distance shorter than that of the first convex lens 10a. The substantially-parallel laser beam 9 having the diameter D2 that is incident on the first convex lens 10a is converted into the substantially-parallel laser beam 5 having the predetermined diameter D1 through the collimator lenses 10 and exits them. The laser beam emitted by the laser generator 2 is $CO_2$ laser.

Using the configuration of the laser fusion bonding apparatus A1 in FIG. 1 in which the laser generator 2 is adapted to generate the substantially-parallel laser beam 5 having the predetermined diameter D1 with which the glass plates 4a and 4b are irradiated, it is impossible to set the diameter of the substantially-parallel laser beam 5 according to the works, whereas in the configuration of the laser fusion bonding apparatus A2 in FIG. 2, the focal distances of the first and second convex lenses 10a and 10b are suitably selected to set the diameter of the substantially-parallel laser beam 5 according to the works 5. Although the diameter of the substantially-parallel laser beam 9 generated by the laser generator 2 is reduced through the collimation 11 in the above description, the focal distance of the first convex lens 10a may be made shorter than that of the second convex lens 10b to thereby enlarge the diameter of the substantially-parallel laser beam 9.

Figure 3:
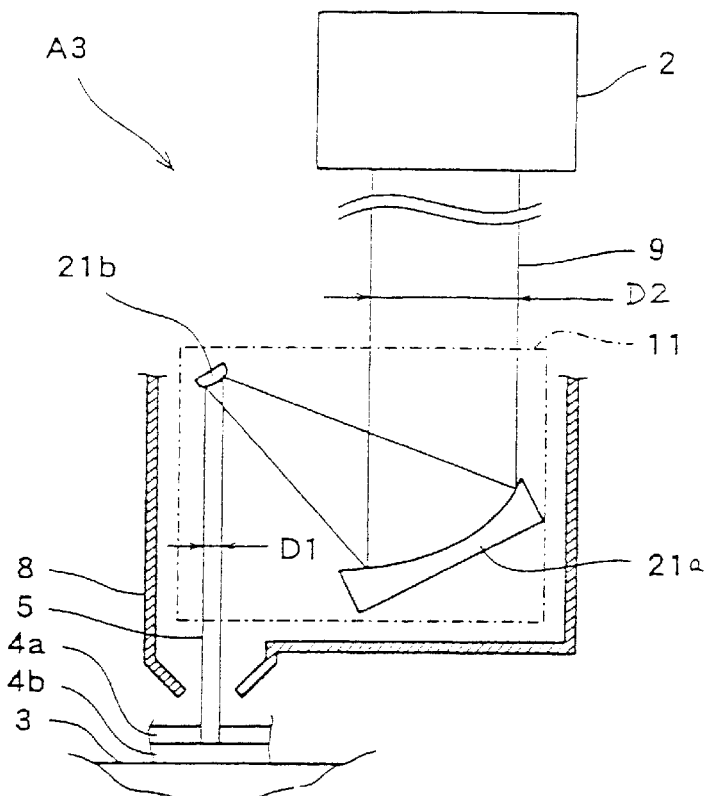
FIG. 3 is a diagram showing an example of yet another structure of the laser fusion bonding apparatus.

Referring to FIG. 3, there is shown a laser fusion bonding apparatus A3, which is identical to the laser fusion bonding apparatus A2 in FIG. 2 except that the collimation 11 is constituted of combination of a concave mirror 21a and a convex mirror 21b that are adapted to convert the diameter of the substantially-parallel laser beam.

Specifically, the machining head 8 is provided with the concave mirror 21a that receives the substantially-parallel laser beam 9 having the diameter D2 emitted by the laser generator 2 and reflects the laser beam 9 in a predetermined direction to bring it into convergence, and the convex mirror 21b that receives the laser beam reflected by the concave mirror 21a and reflects it toward an opening at the end of the machining head 8 as the substantially-parallel laser beam 5 having the predetermined diameter D1. The laser beam emitted by the laser generator 2 is $CO_2$ laser.

With this configuration, like the laser fusion bonding apparatus A2, the focal distances of the concave mirror 21a and the convex mirror 21b are suitably selected to set the diameter of the substantially-parallel laser beam 5 according to the works 5. Although the diameter of the substantially-parallel laser beam 9 generated by the laser generator 2 is reduced through the collimation 11, the laser beam from the laser generator 2 may be first reflected by the convex mirror to thereby enlarge its diameter, and then reflected by the concave mirror to be made parallel. The diameter of the substantially-parallel laser beam generated by the laser generator 2 can be thus enlarged.

Figure 4:
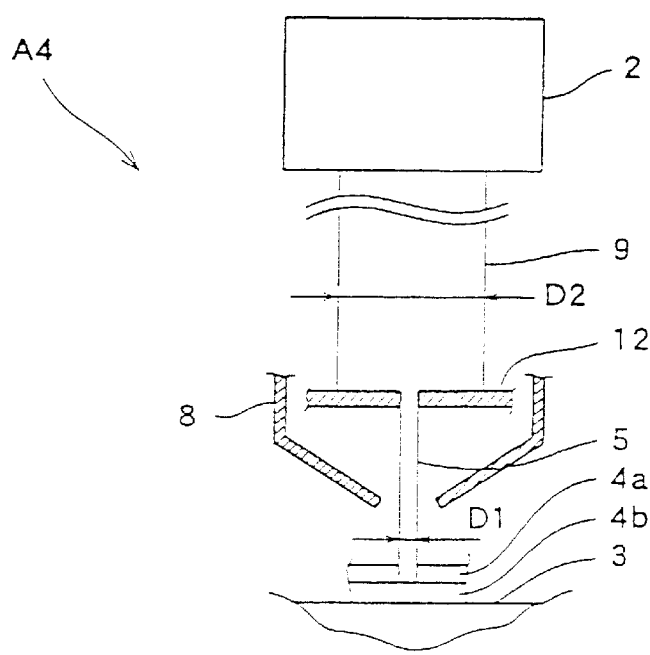
FIG. 4 is a diagram showing an example of a further structure of the laser fusion bonding apparatus.

Referring to FIG. 4, there is shown a laser fusion bonding apparatus A4, which is identical to the laser fusion bonding apparatus A1 in FIG. A1 except that the substantially-parallel laser beam 5 having the predetermined diameter D1 with which the glass plates 4a and 4b are irradiated is generated by passing the substantially-parallel laser beam 9 having the diameter D2 emitted by the laser generator 2 through an aperture 12.

In the laser fusion bonding apparatus A4, the laser generator 2 generates the substantially-parallel laser beam 9 having the diameter D2. In the machining head 8, on the optical path of the substantially-parallel laser beam 9, the aperture 12 having an opening diameter D1 smaller than a laser diameter of an exit of the laser generator 2 is provided. The substantially-parallel laser beam 9 having the diameter D2 emitted by the laser generator 2 passes through the aperture 12 and is converted into the substantially-parallel laser beam 5 having the smaller predetermined diameter D1, with which the glass plates 4a and 4b are irradiated. The laser beam emitted by the laser generator 2 is $CO_2$ laser.

With this configuration, only the change of the opening diameter of the aperture 12 allows the diameter of the substantially-parallel laser beam 5 to be easily set according to the works.

Referring to FIGS. 5A–5C, there is shown a laser fusion bonding apparatus A5, which is adapted to perform preheating, fusion bonding, and slow cooling of the glass plates 4a and 4b by performing exchange among machining heads including collimator lenses. In FIGS. 5A–5C, the same reference numerals in FIG. 2 denote the same or the corresponding parts.

The laser fusion bonding apparatus A5 is adapted to perform preheating, fusion bonding, and slow cooling by performing exchange among three types of machining heads. The three types of machining heads include a machining head 8' in FIG. 5A, a machining head 8 in FIG. 5B, and a machining head 8" in FIG. 5C. The machining head 8' in FIG. 5A includes preheating collimator lenses 10' for converting the stbstantially-parallel laser beam 9 having the diameter D2 from the laser generator 2 into a substantially-parallel laser beam 5' having a diameter D1' that is capable of heating portions of the glass plates 4a and 4b irradiated with the laser beam 5' so as to have a predetermined preheating temperature lower than a fusion bonding temperature of the glass plates 4a and 4b. The machining head 8 in FIG. 5B includes fusion bonding collimator lenses 10 for converting the substantially-parallel laser beam 9 from the laser generator 2 into a substantially-parallel laser beam 5 having a diameter D1 that is capable of heating portions of the glass plates 4a and 4b irradiated with the laser beam 5 so as to have the fusion bonding temperature. The machining head 8" in FIG. 5C includes slow-cooling collimator lenses 10" for converting the substantially-parallel laser beam 9 from the laser generator 2 into a substantially-parallel laser beam 5" having a diameter D1" that is capable of heating portions of the glass plates 4a and 4b irradiated with the laser beam 5" so as to have a slow cooling temperature lower than the preheating temperature. Here, the following condition must be set up: "the diameter D1<the diameter D1'<the diameter D1", or the diameter D1<the diameter D1', the diameter D1 <the diameter D1", the diameter D1'=the diameter D1". The laser beam emitted by the laser generator 2 is $CO_2$ laser.

A laser fusion bonding method according to the laser fusion bonding apparatus A5 will now be described. Initially, as shown in FIG. 5A, the machining head 8' is mounted on the laser fusion bonding apparatus A5. Then, the laser fusion bonding apparatus A5 is activated to thereby irradiate the portions to be fusion bonded of the glass plates 4a and 4b fixed on the work table 3 with the substantially-parallel laser beam 5'. Thereby, the glass plates 4a and 4b are preheated so as to have the predetermined preheating temperature.

Subsequently, the machining head 8' of the laser fusion bonding apparatus A5 is exchanged for the machining head 8. Then, the laser fusion bonding apparatus A5 is activated to thereby irradiate the portions to be fusion bonded with the substantially-parallel laser beam 5. Thereby, the glass plates 4a and 4b are heated so as to have the fusion bonding temperature and fusion bonded.

Finally, the machining head 8 of the laser fusion bonding apparatus A5 is exchanged for the machining head 8". Then, the laser fusion bonding apparatus A5 is activated to thereby irradiate the fusion bonded portions with the substantially-parallel laser beam 5". Thereby, the glass plates 4a and 4b are slowly cooled so as to have the slow cooling temperature to which the fusion bonding temperature is reduced while they are heated by the substantially-parallel laser beam 5".

Thus, according to the laser fusion bonding apparatus A5, like the apparatus and system in FIG. 1, unsatisfactory fusion bonding can be reduced, and simultaneously, crack due to the sharp temperature gradient in the glass plates 4a and 4b can be reduced.

Figure 6:
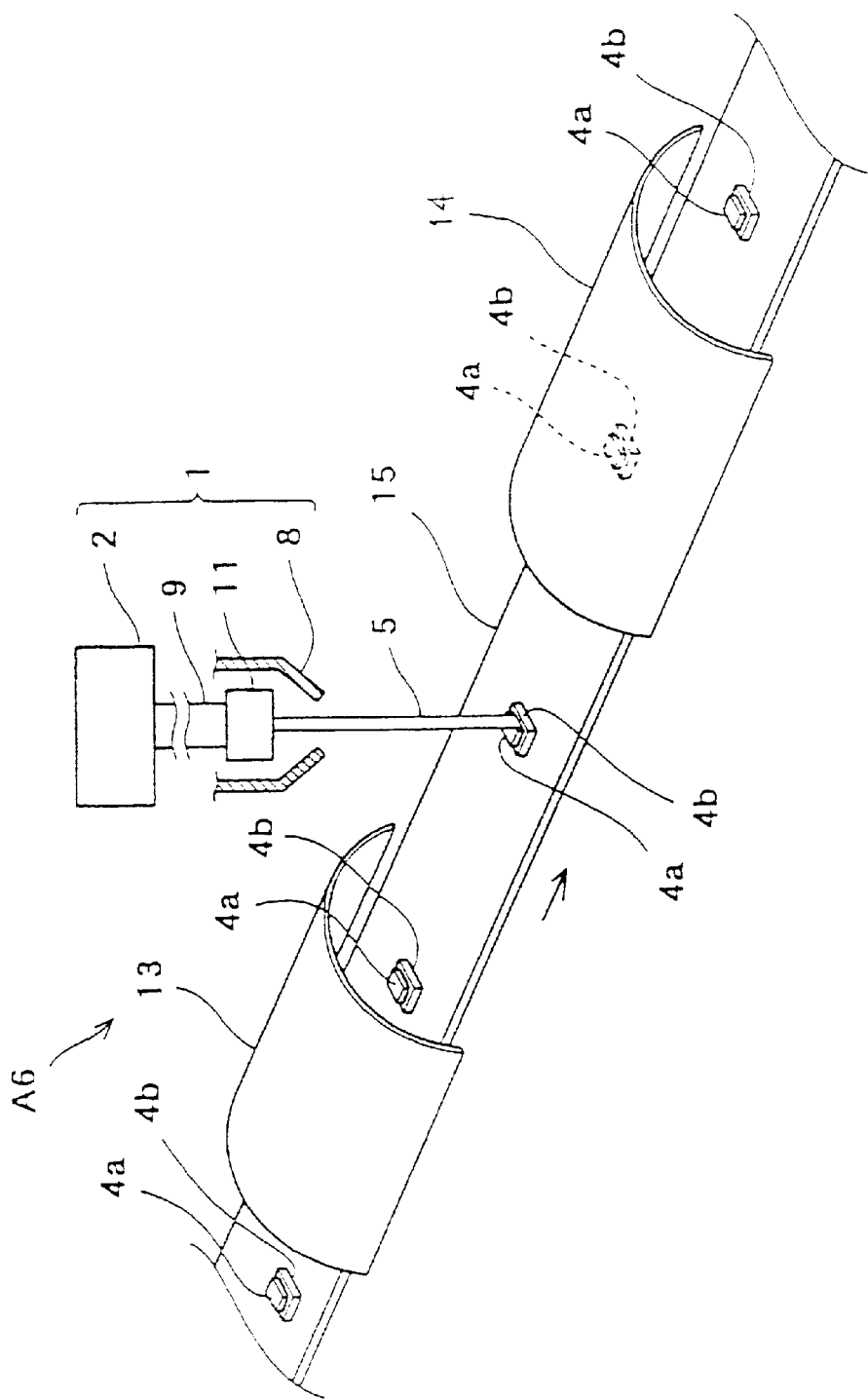
FIG. 6 Is a diagram showing a further example of the apparatus and method for laser fusion bonding.

Referring to FIG. 6, there is shown a laser fusion bonding apparatus A6 automatically capable of performing preheating, fusion bonding, and slow cooling of the glass plates 4a and 4b.

First, outline of configuration of the laser fusion bonding apparatus A6 will be described. The laser fusion bonding apparatus A6 includes a laser beam irradiation unit 1 like the laser fusion bonding apparatuses A2 and A3 in FIG. 2 and FIG. 3, i.e., a laser beam irradiation unit comprising the laser generator 2, the machining head 8, and the collimation 11. The laser fusion bonding apparatus A6 further includes a belt conveyor 15 for conveying the glass plates 4a and 4b, a movement mechanism (not shown) capable of moving the machining head 8 relatively to the belt conveyor 15 in directions of three orthogonal axes, a preheating unit 13 for preheating the glass plates 4a and 4b, and a slow cooling unit 14 for slowly cooling the glass plates 4a and 4b. The belt conveyor 15 is installed in a horizontal direction below the machining head 8. The preheating unit 13 and the slow cooling unit 14 are respectively provided upstream and downstream of the point under the machining head 8 such that it covers the belt conveyor 15. The laser beam emitted by the laser generator 2 is $CO_2$ laser.

The machining head 8 is movable relatively to the belt conveyor 15 in a three-dimensional direction and is capable of changing angles in horizontal and vertical planes by means of the movement mechanism. The preheating unit 13 and the slow cooling unit 14 are respectively provided with heaters (not shown) on inner surfaces thereof and adapted to set heating levels of the heaters to desired values. The belt conveyor 15 is provided with work fixing parts (not shown ), for fixing the glass plates 4a and 4b thereon at predetermined pitch in a longitudinal direction of the belt and the belt is adapted to move at predetermined pitch at predetermined time intervals. Accordingly, each of the work fixing parts is adapted to stop at each of points in the preheating unit 13, under the machining head 8, and in the slow cooling unit 14 for the predetermined time and then pass therethrough.

Subsequently, operation of the laser fusion bonding apparatus A6 so configured will be described. Initially, the heating levels of the preheating unit 13 and the slow cooling unit 14 are respectively set so that the glass plates 4a and 4b have the preheating temperature and the slow cooling temperature, respectively when they pass therethrough.

Then, the glass plates 4a and 4b are fixed on one of the work fixing parts of the belt conveyor 15 and the belt conveyor 15 is activated. The glass plates 4a and 4b fixed on the work fixing part moves into the preheating unit 13, where they are preheated so as to have the predetermined preheating temperature. Following this, the preheated glass plates 4a and 4b move to the point under the machining head 8, where the portions to be fusion bonded are irradiated with the substantially-parallel laser beam 5 emitted by the machining head 8 and thereby fusion bonded. Then, the fusion bonded glass plates 4a and 4b move into the slow cooling unit 14, where they are slowly cooled so as to have the predetermined slow cooling temperature while they are heated.

Although the belt conveyor 15 moves intermittently, it may move continuously and the machining head 8 may follow the glass plates 4a and 4b moving along with the belt conveyor 15 and perform fusion bonding of them.

Figure 5:
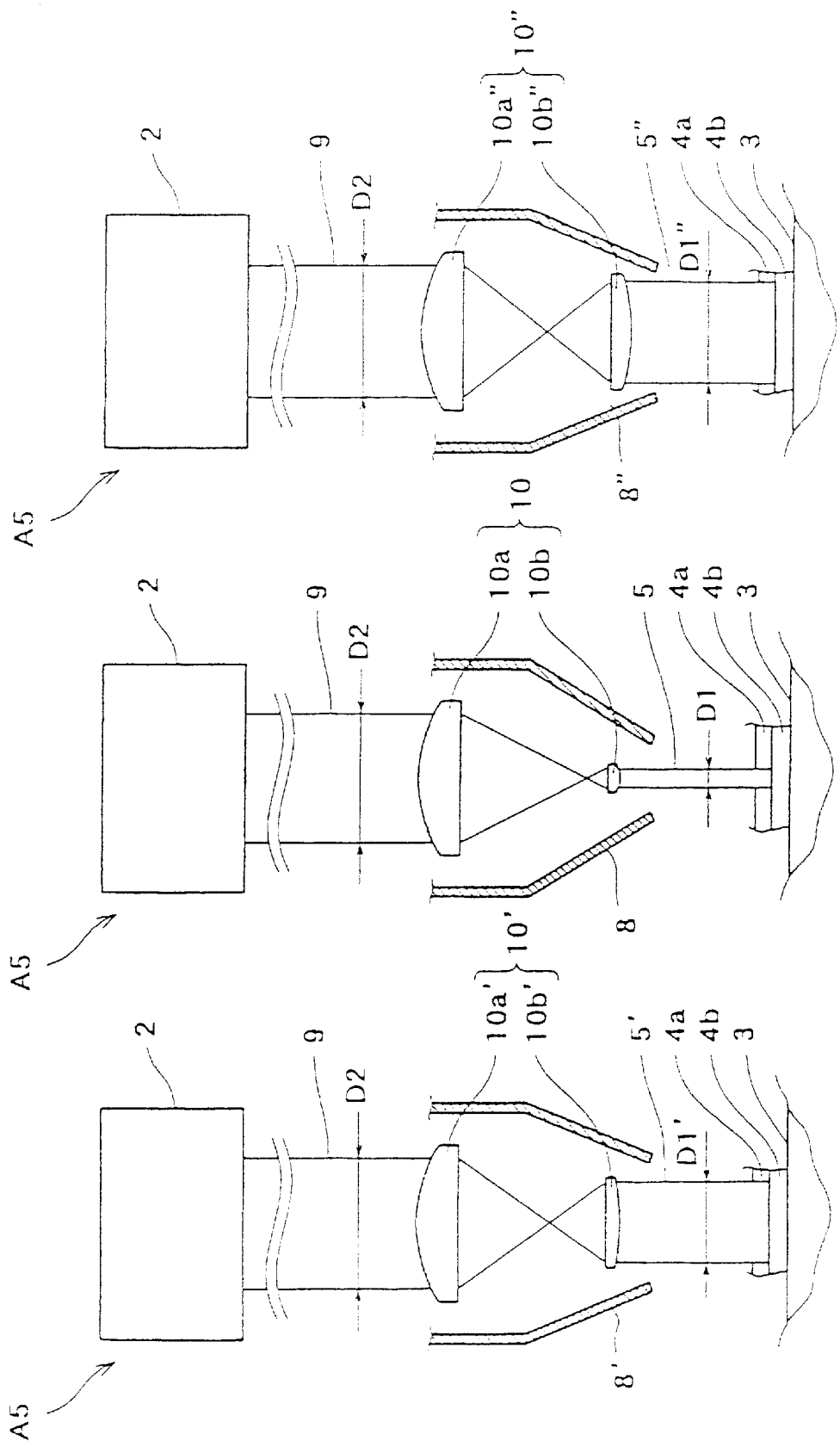

Thus, like the apparatus and system in FIG. 1 or FIG. 5, the laser fusion bonding apparatus A6 is capable of reducing unsatisfactory fusion bonding and reducing crack due to the sharp gradient of temperature in the glass plates 4a and 4b. In addition, since the preheating, the fusion boding, and the slow cooling of the glass plates 4a and 4b are automatically performed, labor cost can be reduced.

Figure 7A:
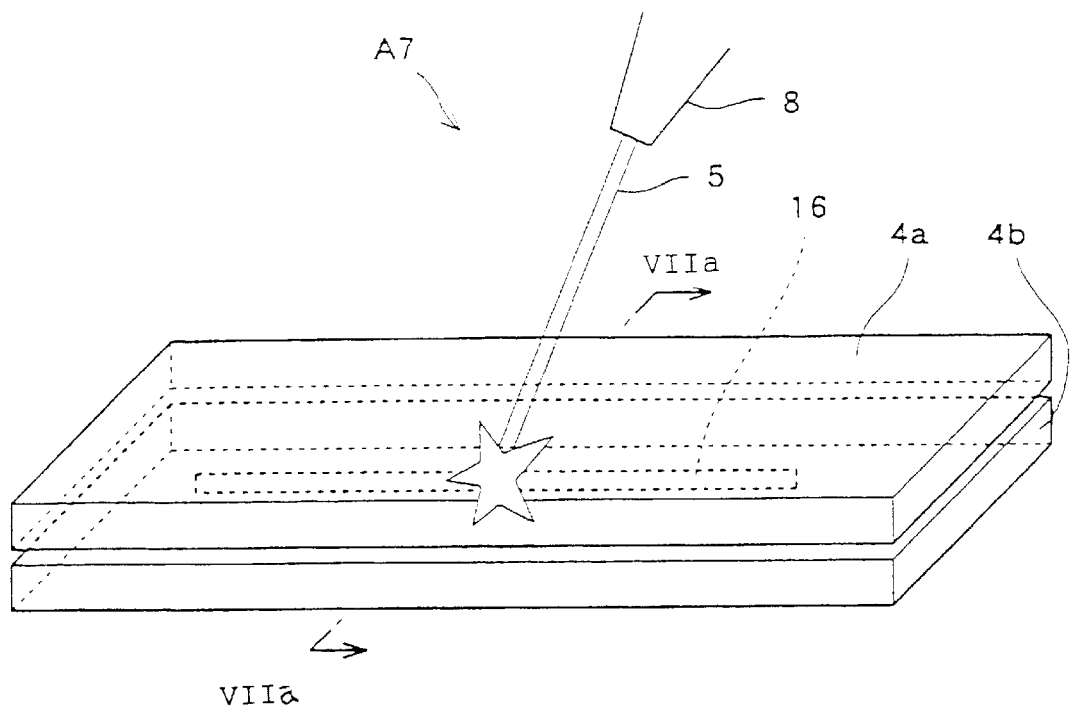
Figure 7B:
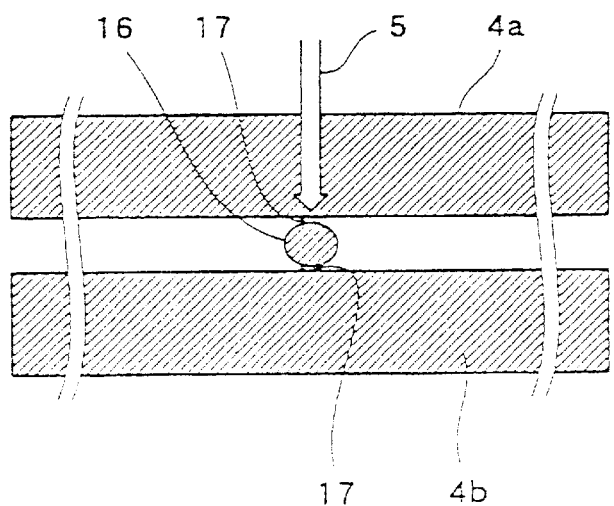
Figure 8A:
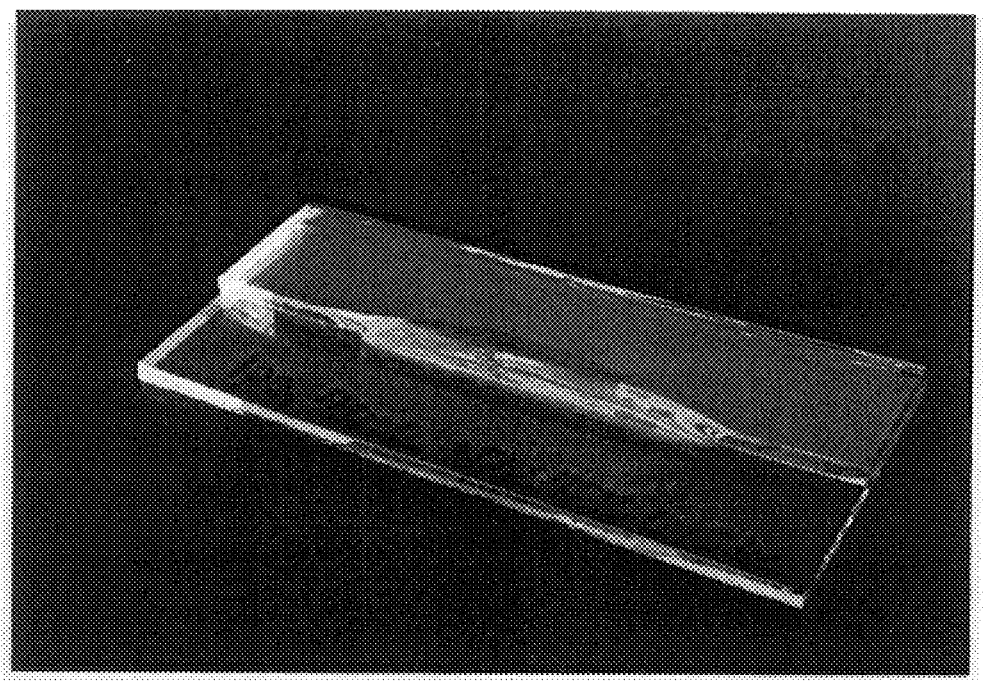
Figure 8B:
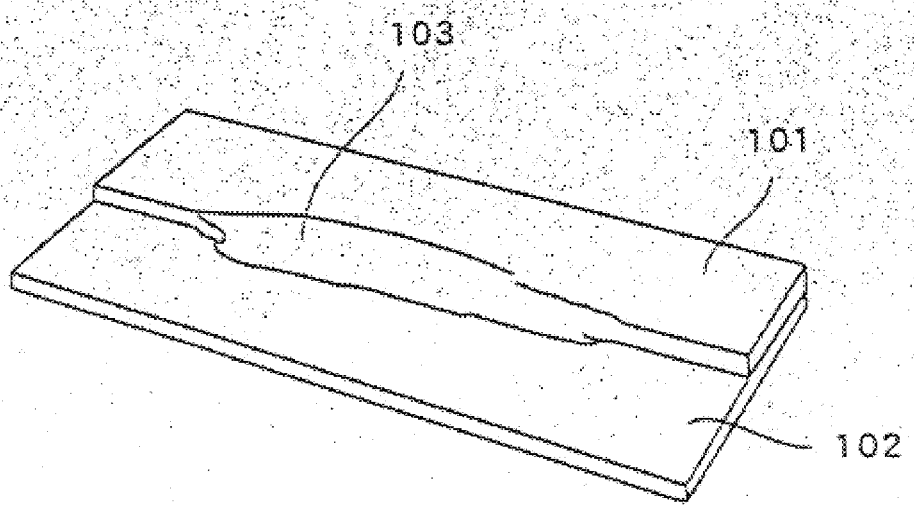
Figure 9A:
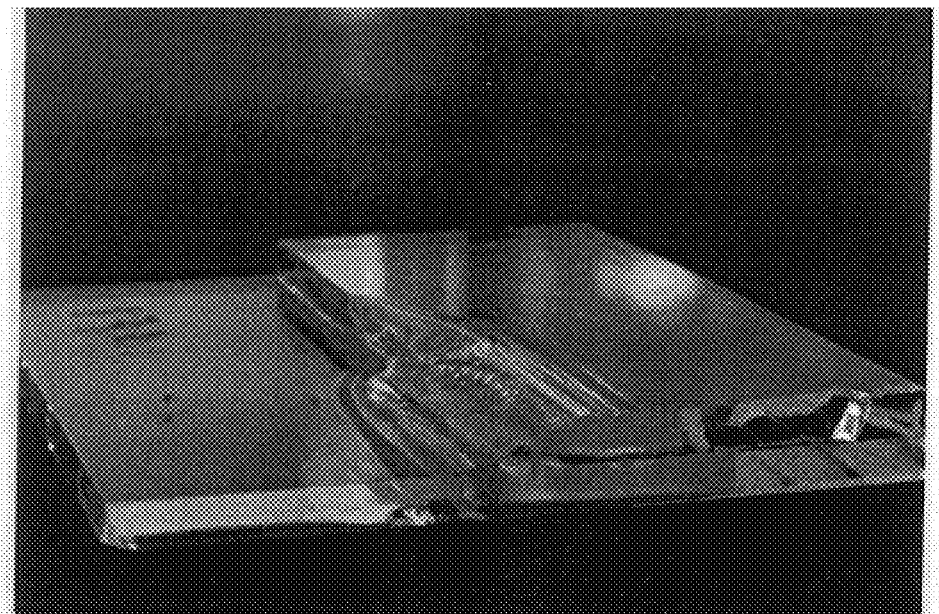
Figure 9B:
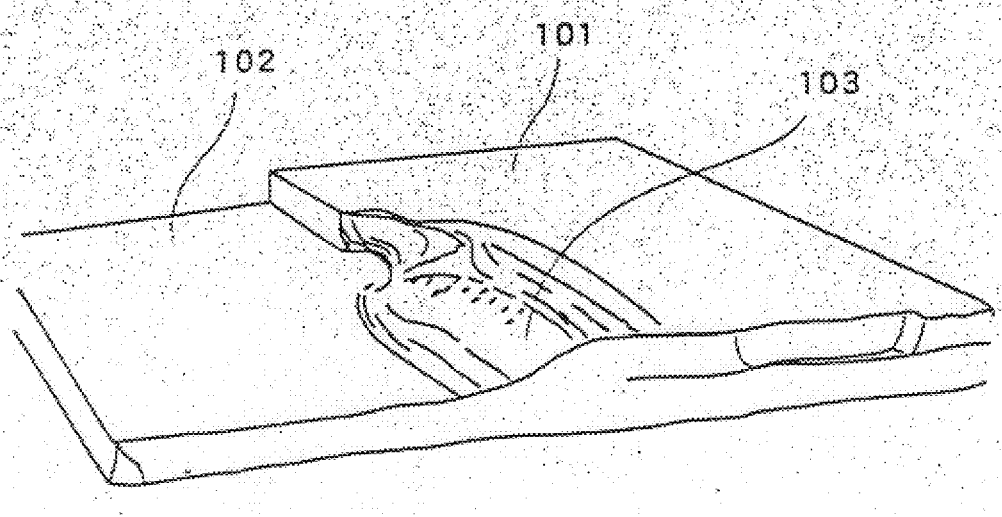
Figure 10A:
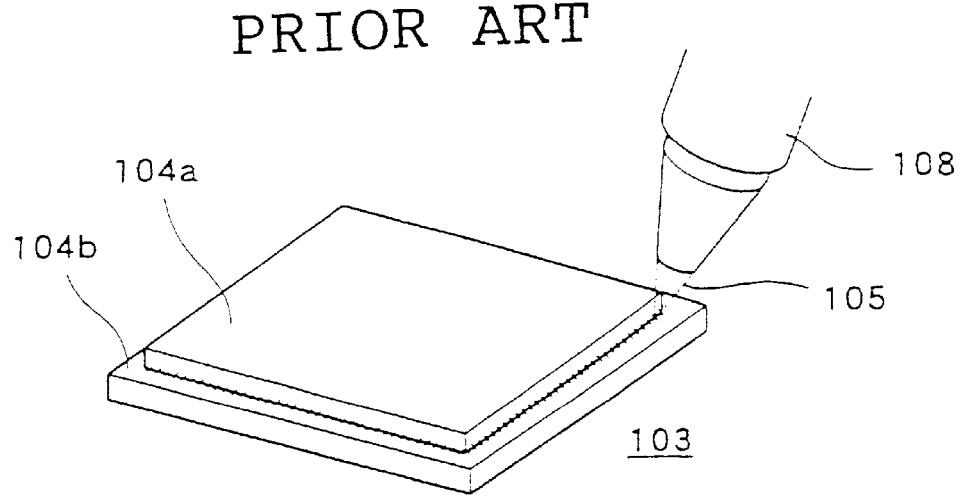
Figure 10B:
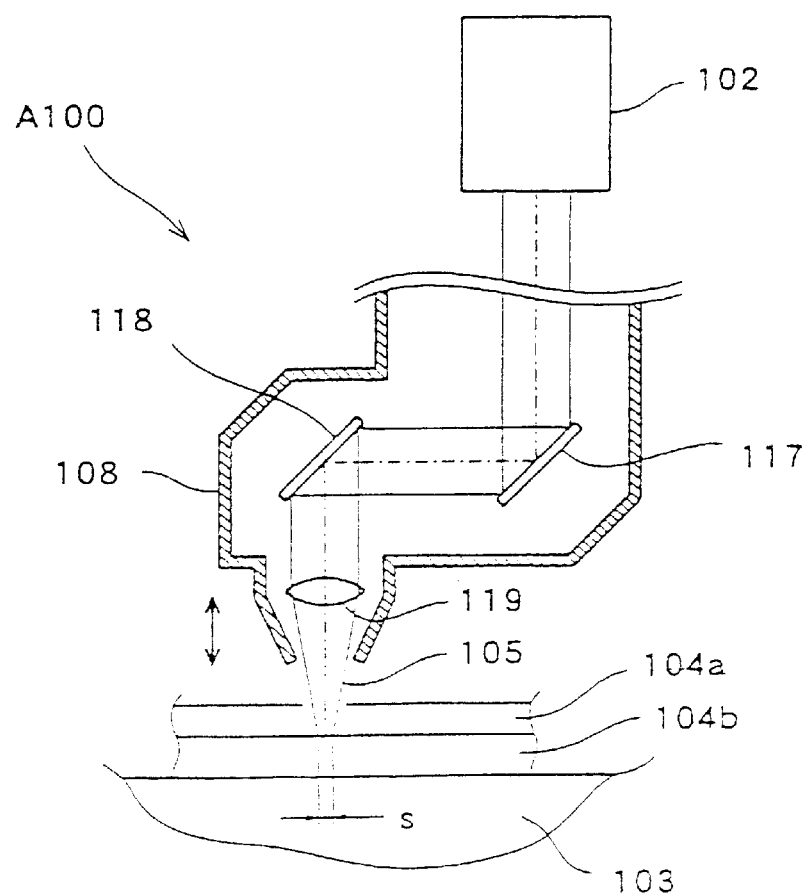

Referring to FIGS. 7A and 7B, there is shown a laser fusion bonding apparatus A7, which is provided with a laser beam irradiation unit including a laser generator (not shown) for generating YAG laser. The glass plates 4a and 4b as the first and second works are each provided with a wiring 17 comprising a conductor made of Cu or the like on one surface thereof. The glass plates 4a and 4b are placed such that their surfaces with the wirings 17 are opposite to each other. The glass plates 4a and 4b are made of colorless and transparent glass. Between the wirings 17 of the glass plates 4a and 4b, a colored low fusing point glass 16 is interposed as a fusion bonding material. The distortion point of the low fusing point glass 16 is 400–450° C. In other respects, the laser fusion bonding apparatus A7 is configured like the laser fusion bonding apparatuses A1–A6 in FIGS. 1–6.

The laser fusion bonding apparatus A7 is configured described above. In the laser fusion bonding apparatus A7, the machining head 8 emits the substantially-parallel laser beam 5, with which the portion on which the low fusing point glass 16 is disposed is irradiated from above of the glass plate 4a. The YAG laser penetrates the colorless and transparent glass, and therefore, the substantially-parallel laser beam 5 penetrates the glass plate 4a. The energy of the YAG laser is absorbed by the colored low fusing point glass 16, and then only the glass 16 is fused. By using this fused low fusing point glass 16 as the fusion bonding material, the two glass plates 4a and 4b are fusion bonded. In this case, the wirings 17 are not damaged because they have a distortion point higher than that of the low fusing point glass 16.

The preferred embodiments of the laser fusion bonding apparatus and the laser fusion bonding method of the present invention have been thus far described with reference to the drawings. While both the first and second works to be fusion bonded are made of glass in the above embodiments, one of them may be made of glass, ceramics, or metal, and the other may be made of glass or ceramics. In this case, the metal having the fusing point closer to that of the glass is suitable for use in the laser fusion bonding apparatus and the fusion bonding method of the present invention. For example, Al having a fusing point of 660.3° C., Cu having a fusing point of 1083.5° C., and the like are suitably used.

In addition, while the $CO_2$ laser and the YAG laser are used as the laser beam, other types of solid laser, gas laser, semiconductor laser, and liquid laser may be used.

Further, the preheating process or the slow cooling process before or after the fusion bonding process in the above embodiments may be omitted.

Examples

Referring to FIGS. 8A–8B, and FIGS. 9A–9B, there is shown a glass artifact fusion bonded by irradiating peripheral portions of glass plates 101 and 102 with the substantially-parallel laser beam by using a laser fusion bonding apparatus having configuration similar to that of the laser fusion bonding apparatus A1 in FIG. 1. In this case, the laser beam with which the glass plates are irradiated is the $CO_2$ laser.

In a glass artifact (not shown) fusion bonded by the conventional laser fusion bonding apparatus, the glasses are locally fusion bonded. Hence, it is not decided from their appearances whether or not fusion bonding has been reliably performed. On the other hand, as indicated by 103 in FIGS. 8A–8B and FIGS. 9A–9B, the glass plates 101 and 102 have fusion bonded portions of a relatively wider range, and it is confirmed from their appearances that they have been reliably fusion bonded.

Numerous modifications and alternative embodiments of the invention will be apparent to those skilled in the art in view of the foregoing description. Accordingly, the description is to be constructed as illustrative only, and is provided for the purpose of teaching those skilled in the art the best mode of carrying out the invention. The details of the structure and/or function may be varied substantially without departing from the spirit of the invention.

What is claimed is:

1. A laser fusion bonding method for fusion bonding portions of works each comprised of a glass plate and wherein a spacer is interposed between the works, comprising irradiating peripheral portions of the works with a substantially-parallel laser beam.

2. The laser fusion bonding method of claim 1, wherein the substantially-parallel laser beam has a projected shape substantially identical to a predetermined shape so that a spot irradiated with the laser beam in the portions to be fusion bonded has the predetermined shape.

3. The laser fusion bonding method of claim 2, wherein a sectional shape of the laser beam emitted by the laser generator is converted through a collimation to thereby generate the substantially-parallel laser beam whose projected shape is substantially identical to the predetermined shape.

4. The laser fusion bonding method of claim 3, wherein the collimation is constituted of collimator lenses.

5. The laser fusion bonding method of claim 3, wherein the collimation is constituted of combination of a concave mirror and a convex mirror.

6. The laser fusion bonding method of claim 2, wherein a sectional shape of the laser beam emitted by the laser generator is converted through an aperture to thereby generate the substantially-parallel laser beam whose projected shape is substantially identical to the predetermined shape.

7. The laser fusion bonding method of claim 2, wherein the substantially-parallel laser beam whose projected shape is substantially identical to the predetermined shape is generated by a laser generator.

8. The laser fusion bonding method of claim 1, comprising:
preheating the portions to be fusion bonded so as to have a temperature lower than a fusion bonding temperature of the works before the works are fusion bonded by using the substantially-parallel laser beam; and
slowly cooling the fusion bonded portions so as to have a temperature lower than the fusion bonding temperature after the works are fusion bonded by using the substantially-parallel laser beam.

9. The laser fusion bonding method of claim 1, wherein one of the at least two works is made of glass, ceramics, or metal, and the other is made of glass or ceramics.

10. The laser fusion bonding method of claim 8, wherein the preheating, the fusion bonding of the works, and the slowly cooling are performed by changing a diameter of the substantially-parallel laser beam.

11. A laser fusion bonding method for fusion bonding works each comprised of a colorless glass plate by irradiating a fusion bonding material made of a colorless glass interposed between the works with a substantially-parallel YAG laser beam through at least one of the works so as to fuse the fusion bonding material.

* * * * *